(12) United States Patent
Graetz et al.

(10) Patent No.: US 11,165,083 B1
(45) Date of Patent: Nov. 2, 2021

(54) METHOD OF CONTROLLING RATE OF HYDROGEN RELEASE FROM METASTABLE HYDROGEN CARRIERS

(71) Applicant: HRL LABORATORIES, LLC, Malibu, CA (US)

(72) Inventors: Jason A. Graetz, Calabasas, CA (US); John J. Vajo, West Hills, CA (US)

(73) Assignee: HRL Laboratories, LLC, Malibu, CA (US)

(*) Notice: Subject to any disclaimer, the term of this patent is extended or adjusted under 35 U.S.C. 154(b) by 0 days.

(21) Appl. No.: 16/283,454

(22) Filed: Feb. 22, 2019

Related U.S. Application Data

(62) Division of application No. 15/440,370, filed on Feb. 23, 2017, now Pat. No. 10,297,848.

(60) Provisional application No. 62/380,268, filed on Aug. 26, 2016.

(51) Int. Cl.
| | |
|---|---|
| *H01M 8/06* | (2016.01) |
| *H01M 8/04* | (2016.01) |
| *C01B 3/04* | (2006.01) |
| *H01M 8/065* | (2016.01) |
| *H01M 8/04537* | (2016.01) |
| *H01M 8/0438* | (2016.01) |

(52) U.S. Cl.
CPC .............. *H01M 8/065* (2013.01); *C01B 3/04* (2013.01); *H01M 8/04425* (2013.01); *H01M 8/04582* (2013.01); *H01M 2250/20* (2013.01)

(58) Field of Classification Search
None
See application file for complete search history.

(56) References Cited

U.S. PATENT DOCUMENTS

| | | | |
|---|---|---|---|
| 8,147,796 B2 * | 4/2012 | Lu | C01B 3/0078 423/646 |
| 9,034,531 B2 | 5/2015 | Fabian et al. | |
| 10,297,848 B1 * | 5/2019 | Graetz | H01M 8/04582 |
| 2003/0192779 A1 | 10/2003 | Cheng | |
| 2004/0094134 A1 | 5/2004 | Redmond et al. | |
| 2005/0047994 A1 * | 3/2005 | Meisner | C01B 21/0923 423/658.2 |
| 2005/0191235 A1 * | 9/2005 | Vajo | C01B 3/065 423/657 |

OTHER PUBLICATIONS

Liu et al., "Synthesis and hydrogen storage thermodynamics and kinetics of Mg(AlH4)2 submicron rods." Int'l J. of Hydrogen Energy, vol. 37 (2012), p. 18148-18154.*

(Continued)

*Primary Examiner* — Daniel Berns
(74) *Attorney, Agent, or Firm* — Lewis Roca Rothgerber Christie, LLP

(57) ABSTRACT

According to an embodiment of the present disclosure, a method of controlling a rate of hydrogen release from a decomposition reaction of a hydrogen carrier includes: relating the rate to a temperature and a composition of the metastable hydrogen carrier; determining the composition of the metastable hydrogen carrier; and adjusting the temperature according to the relating of the rate and the determining of the composition.

13 Claims, 9 Drawing Sheets
(4 of 9 Drawing Sheet(s) Filed in Color)

(56) References Cited

OTHER PUBLICATIONS

Wolverton et al., "Hydrogen storage in calcium alanate: First-principles thermodynamics and crystal structures." Physical Review B, vol. 75 (2007), 064101.*

Orimo et al., "Intrinsic and mechanically modified thermal stabilities of α-, β- and γ-aluminum trihydrides AlH3." Appl. Phys. A, vol. 83 (2006), pp. 5-8.*

Hua et al., "Technical Assessment of Compressed Hydrogen Storage Tank Systems for Automotive Applications," U.S. Dept. of Energy Report prepared by Argonne National Laboratory, 2010, 81 pages.

Jason Graetz et al., Thermodynamics of the α, β and γ polymorphs of $AlH_3$, Journal of Alloys and Compounds, 2006, pp. 262-265, vol. 424, Elsevier B.V.

M. Mamatha et al., Mechanochemical preparation and investigation of properties of magnesium, calcium and lithium-magnesium alanates, Journal of Alloys and Compounds, 2006, pp. 78-86, vol. 407, Elsevier B.V.

\* cited by examiner

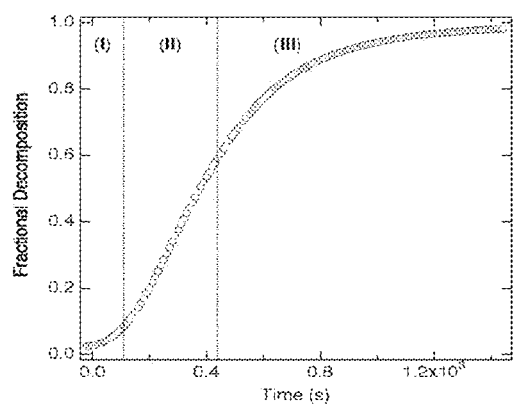
FIG. 6
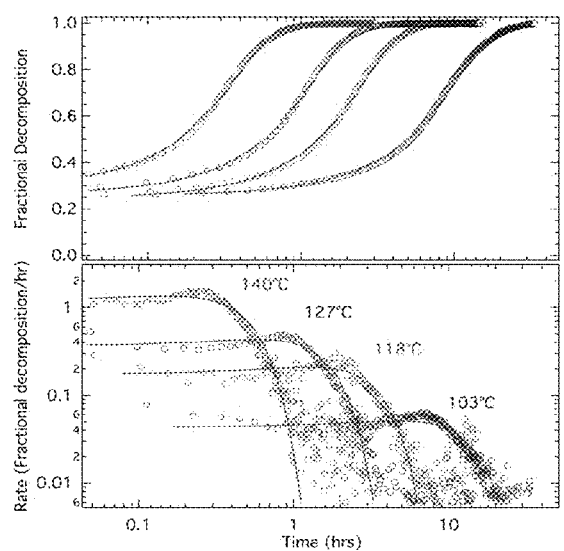
FIG. 7 (a)-upper and 7 (b)-lower,
temperatures for the curves in FIG. 7 (a) and 7 (b) from left to right are 140 °C, 127 °C, 118 °C and 103 °C The temperatures for the curves in FIG. 9 from top to bottom are 140°C, 127°C, 118°C and 103°C

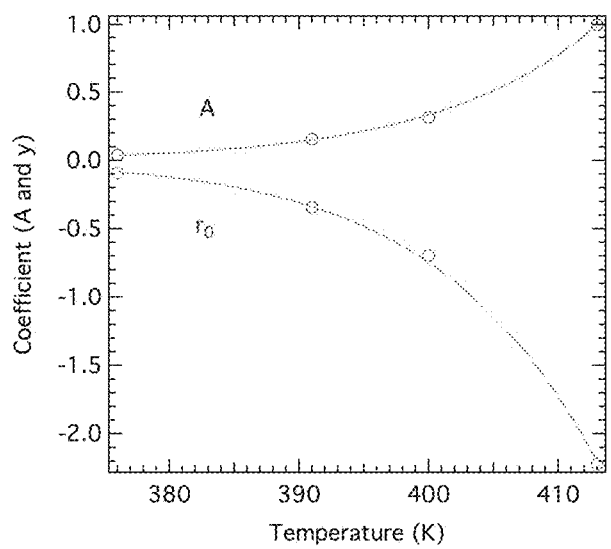
FIG. 10
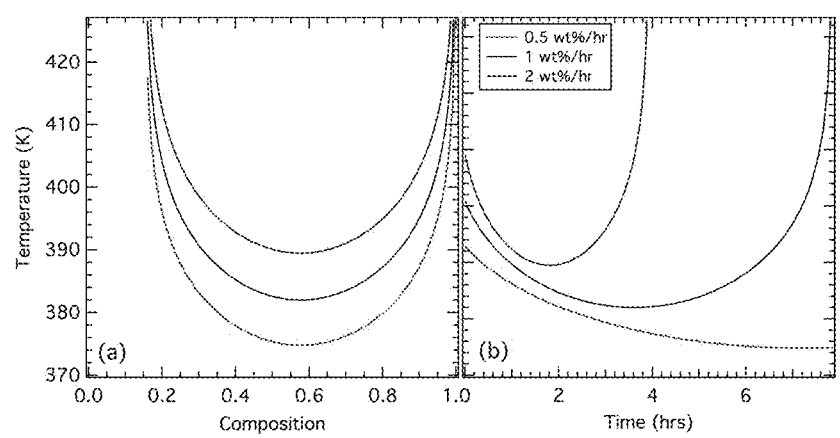
FIG. 11 (a)-left and (b)-right
The constant rate for the curves in each of FIGS 11 (a) and (b) are from top to bottom 2 wt%/hr, 1 wt%/hr and 0.5 wt%/hr.

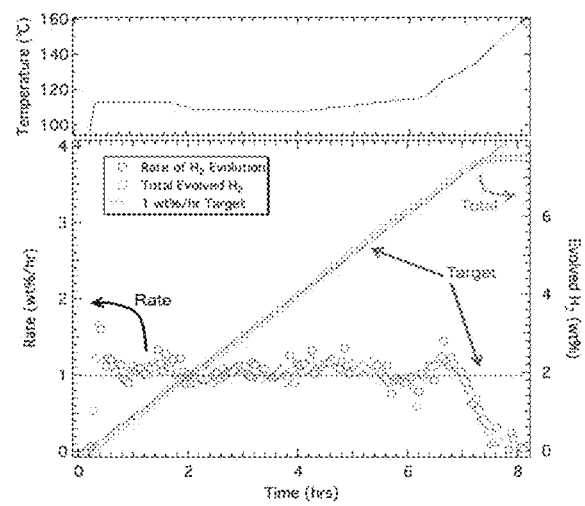
FIG. 12 (a)-upper and (b)-lower
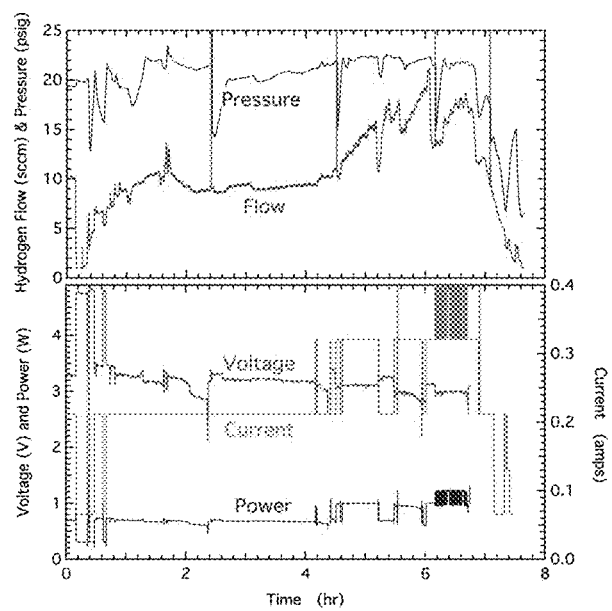
FIG. 13 (a)-upper and 13 (b)-lower

METHOD OF CONTROLLING RATE OF HYDROGEN RELEASE FROM METASTABLE HYDROGEN CARRIERS

CROSS-REFERENCE TO RELATED PATENT APPLICATIONS

This application is a divisional of U.S. patent application Ser. No. 15/440,370, filed on Feb. 23, 2017, which claims priority to and the benefit of U.S. Provisional Patent Application No. 62/380,268, filed in the United States Patent and Trademark Office on Aug. 26, 2016, the entire contents of both of which are incorporated herein by reference.

This application is also related to and incorporates by reference in its entirety, as if set forth in full, U.S. patent application Ser. No. 15/440,534, filed on Feb. 23, 2017, and entitled "Power Management System And Method of Operating the Same," which claims priority to and the benefit of U.S. Provisional Patent Application No. 62/380,272, filed in the United States Patent and Trademark Office on Aug. 26, 2016, the entire contents of both of which are incorporated herein by reference.

FIELD

The following description relates generally to method of controlling the rate of hydrogen release from metastable hydrogen carriers.

BACKGROUND

The possibility of utilizing hydrogen as a reliable energy carrier for both stationary and mobile applications has gained renewed interest in recent years due to improvements in low temperature fuel cells and a reduction in hydrogen production costs. There are a variety of ways to store hydrogen, and the more conventional methods include compressed gas (typically at a pressure of 350 or 700 bar) and liquefaction, where the hydrogen is cooled to below its boiling point (20 K). However, these options are costly and require extremely high pressures or low temperatures to achieve reasonable hydrogen densities.

Metastable hydrides (also referred to as metastable hydrogen carrier interchangeably hereinafter) can offer high volumetric and gravimetric hydrogen densities and rapid hydrogen release rates at low temperatures. Unlike other kind of metal hydrides, such as reversible metal hydrides, metastable hydrogen carriers rely on kinetic barriers to limit or prevent the release of hydrogen and therefore can be prepared in a stabilized state far from equilibrium. The rapid, low temperature hydrogen evolution rates that can be achieved with these materials offer much promise for fuel cells such as mobile proton exchange membrane (PEM) fuel cell applications. Applications of the PEM fuel cells may include soldier power, unmanned aerial vehicles (UAV), un-manned underwater vehicles along with fuel cell vehicles.

One of the challenges with a kinetically stabilized hydrogen carrier, such as the metastable hydride, is controlling the release of hydrogen to match the demand from the fuel cell or other energy conversion devices. Left unchecked, the hydrogen pressure can become too high, requiring venting to the environment, or fall too low, starving the fuel cell or energy conversion device.

SUMMARY

An aspect according to one or more embodiments of the present invention is directed toward a method of determining the rate of hydrogen release from a metastable hydrogen carrier. The method of determining the rate of hydrogen release relates the rate of hydrogen release with the temperature and composition of the metastable hydrogen carrier.

Another aspect according to one or more embodiments of the present invention is directed toward a method of controlling the rate of hydrogen release according to the temperature and composition of a metastable hydrogen carrier.

Additional aspects will be set forth in part in the description which follows, and, in part, will be apparent from the description, or may be learned by practice of the presented embodiments.

According to an embodiment of the present disclosure, a method of controlling a rate of hydrogen release from a decomposition reaction of a metastable hydrogen carrier includes: relating the rate to a temperature and a composition of the metastable hydrogen carrier; determining the composition of the metastable hydrogen carrier; and adjusting the temperature according to the relating of the rate and the determining of the composition. The decomposition reaction may be a thermally neutral reaction, an endothermic reaction or an exothermic reaction.

The determining of the composition of the metastable hydrogen carrier may include measuring a hydrogen release rate, integrating the hydrogen release rate to determine a cumulative amount of evolved hydrogen, and dividing the cumulative amount of evolved hydrogen by a total amount of stored hydrogen in the metastable hydrogen carrier to determine the composition.

The relating of the rate to the temperature and the composition may be related by a function with one or more constants independent of temperature and one or more parameters dependent on temperature. The temperature dependent parameters may be dependent on temperature in an Arrhenius form.

The relating of the rate to the temperature and the composition may include: conducting a plurality of isothermal decomposition reactions at a plurality of temperatures to obtain cumulative decomposition curves or derivative decomposition curves for each of the plurality of temperatures; fitting the cumulative or derivative decomposition curves to the function with the one or more constants independent of temperature and the one or more parameters dependent on temperature with pre-exponential and exponential constants; determining the temperature independent constants and pre-exponential and exponential constants of the temperature dependent parameters; and analytically or numerically solving the function. Temperature may be included explicitly in the function. The temperature dependent parameters may be dependent on temperature in an Arrhenius form, and the function may have the Arrhenius form explicitly included for the temperature.

The relating of the rate to the temperature and composition may be determined by Equation 1:

$$r = \exp\left(\frac{-E_a}{RT}\right)\left(r_{00} + \frac{A_0}{(x-x_0)^2 + B}\right), \quad \text{Equation 1}$$

wherein in Equation 1, r is the rate of hydrogen release, T is the temperature of the metastable hydrogen carrier, x is the composition (e.g., the current composition) of the metastable hydrogen carrier, $x_0$ is an initial composition of the metastable hydrogen carrier, R is the gas constant, and $E_a$, $r_{00}$, $A_0$, and B are constants.

In another embodiment, the relating of the rate to the temperature and the composition may be through a look-up table including a plurality of rows or columns of data, each row or column of data includes a rate of hydrogen release and corresponding temperature and composition of the metastable hydrogen carrier.

According to an embodiment of the present disclosure, a method for controlling a rate of hydrogen release from a metastable hydrogen carrier according to a rate relation includes: determining a target rate of hydrogen release $r_i$ at $t_i$ in one of a first or second act, t representing time and i being an integer; determining a composition $x_i$ of the metastable hydrogen carrier at $t_i$ in another one of the first or second act; determining a required temperature at $t_i$ according to the rate relation in a third act; adjusting a temperature of the metastable hydrogen carrier according to the required temperature in a fourth act; and repeating acts 1 through 4 for a subsequent $t_{i+1}$, wherein the rate relation determines the required temperature according to the target rate of hydrogen release and the composition of the metastable hydrogen carrier.

The target rate of hydrogen release may be a constant or a variable of time.

The rate relation may be determined by Equation 2:

$$T = \left[ -\frac{R}{E_a} \ln\left( \frac{r}{r_{00} + \frac{A_0}{(x-x_0)^2 + B}} \right) \right]^{-1}, \quad \text{Equation 2}$$

wherein in Equation 2, r represents the target rate, T represents the required temperature, R is the gas constant, $E_a$, $r_{00}$, $A_0$, and B are constants, $x_0$ is an initial composition and x is the current composition of the metastable hydrogen carrier.

The determining of the target rate of hydrogen release may include determining a desired load of a power system, the power system utilizing the hydrogen from the metastable hydrogen carrier as a fuel.

The determining of the desired load of the power system may include measuring a current draw of a fuel cell.

The determining of a composition $x_{i+1}$ of the metastable hydrogen carrier at $t_{i+1}$ in the repeating of the acts 1 through 4 for a subsequent $t_{i+1}$ may include calculating a product of the hydrogen release rate $r_i$ and $(t_{i+1}-t_i)$; and adding the product and $x_i$ to obtain $x_{i+1}$.

The method may further include: determining an initial composition of the metastable hydrogen carrier prior to the first act at $t_1$; and utilizing the initial composition of the metastable hydrogen carrier as the composition of the metastable hydrogen carrier at $t_i$ in the determining of the composition of the metastable hydrogen carrier in the other one of the first or second act.

The determining of the initial composition of the metastable hydrogen carrier may include: heating the metastable hydrogen carrier according to a chosen temperature profile; measuring a rate of hydrogen release corresponding to the chosen temperature profile; and determining the initial composition of the metastable hydrogen carrier according to Equation 2.

The chosen temperature profile may be a constant temperature step, a plurality of constant temperature steps, a linear ramp, a sine wave, or a combination thereof.

The measuring of the rate of hydrogen release may utilize a flow meter or a pressure gauge.

The rate relation may be determined by a look-up table comprising a plurality of rows or columns of data, each row or column of data includes a rate of hydrogen release and corresponding temperature and composition of the metastable hydrogen carrier.

According to another embodiment of the present disclosure, a method of determining a rate relation of hydrogen release from a metastable hydrogen carrier according to a temperature and composition includes: conducting a plurality of isothermal decomposition reactions at a plurality of temperatures to obtain data on composition as a function of time for each of the plurality of temperatures; calculating a rate of hydrogen release from the data; determining constants $E_a$, $A_0$, $x_0$, $r_{00}$ and B of Equation 1 according to the rate and the composition; and determining the rate of hydrogen release at a given temperature and composition utilizing Equation 1 or a look-up table:

$$r = \exp\left(\frac{-E_a}{RT}\right)\left(r_{00} + \frac{A_0}{(x-x_0)^2 + B}\right) \quad \text{Equation 1}$$

wherein in Equation 1, $A_0$, $x_0$, $r_{00}$ and B are constants, r represents the rate and x represents the composition of the metastable hydrogen carrier.

$E_a$, $r_{00}$, $A_0$, $x_0$ and B may be determined utilizing numerical fits to isothermal cumulative or fractional decomposition curves over a range of temperatures.

$E_a$, $r_{00}$, $A_0$, $x_0$ and B may be determined utilizing numerical fits to isothermal derivative decomposition curves.

A Lorentzian function, a Gaussian function or a Voigt function may be utilized to describe isothermal derivative decomposition curves.

The look-up table may include a plurality of rows or columns of data, each row or column of data includes a rate of hydrogen release and corresponding temperature and composition of the metastable hydrogen carrier.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other features and advantages of the present invention will be better understood by reference to the following detailed description when considered in conjunction with the accompanying drawings. It is understood that selected structures and features have not been shown in certain drawings so as to provide better viewing of the remaining structures and features.

FIG. 6 is a plot illustrating a typical isothermal decomposition curve of $\alpha$-AlH$_3$.

FIG. 7 (a) is a plot showing the fractional decomposition (composition) of $\alpha$-AlH$_3$ and FIG. 7 (b) is a plot showing the derivative of the fractional decomposition (rate).

FIG. 10 is a plot showing fit parameters, A(T) and r$_0$(T) as a function of temperature. The solid lines represent fits utilizing an Arrhenius function.

FIG. 11 (a) is a plot showing constant rate curves (at a rate of 0.5 wt %/hr, 1 wt %/hr and 2 wt %/hr) calculated utilizing Equation 2 plotted versus composition, and FIG. 11 (b) is a plot showing the constant rate curves plotted versus time.

FIG. 12 (a) is a plot showing the temperature versus time of AlH$_3$ utilized to achieve the target desorption rate of 1 wt %/hr as determined from Equation 2, and FIG. 12 (b) is a plot showing the rate of hydrogen release and total amount of hydrogen evolved along with the target values utilized in the rate equation.

FIG. 13 (a) is a plot showing the hydrogen flow rate and pressure versus time, and FIG. 13 (b) shows the current, voltage and power output from the fuel cell over the course of about 7 hours.

DETAILED DESCRIPTION

Figure 1:
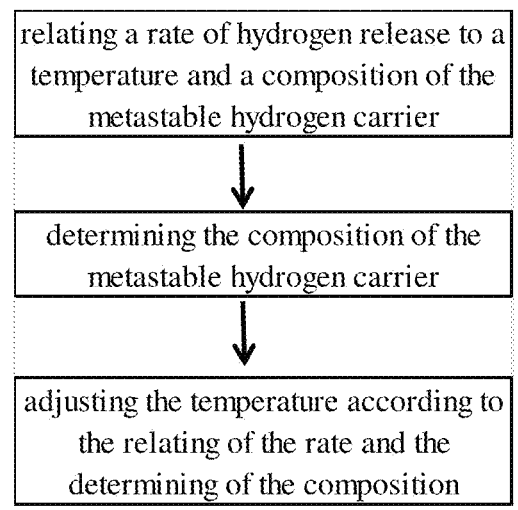
FIG. 1 is a flow chart illustrating a method of controlling a rate of hydrogen release from a decomposition reaction of a hydrogen carrier according to an embodiment of the present disclosure.

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Expressions such as "at least one of" or "at least one selected from" when preceding a list of elements, modify the entire list of elements and do not modify the individual elements of the list. Further, the use of "may" when describing embodiments of the present invention refers to "one or more embodiments of the present invention."

As used herein, the terms "substantially," "about," and similar terms are used as terms of approximation and not as terms of degree, and are intended to account for the inherent deviations in measured or calculated values that would be recognized by those of ordinary skill in the art. Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Metastable hydrogen carriers (also referred to as metastable hydrides, or hydrogen carriers under metastable conditions) are hydrogen carriers characterized by equilibrium hydrogen pressures that are higher than the pressures at which hydrogen is actually released. Equivalently, the temperatures required for practical rates of hydrogen release are higher than the equilibrium temperatures required for a chosen release pressure. For these materials, hydrogen release is mainly controlled by temperature and not by the equilibrium hydrogen pressure. Thus the equilibrium pressure over the range of temperatures at which hydrogen is being released is higher than the delivery pressure for the device utilizing the hydrogen. For fuel cells, this delivery pressure is typically about 1 bar (100 kPa) to about 5 bar. These materials are referred to as metastable because thermodynamically when the equilibrium hydrogen pressure is higher than the pressure at which hydrogen is released, the release of hydrogen has a negative free energy change (delta-G less than 0 kJ/mol). Therefore, there is a thermodynamic driving force for the release of hydrogen (hydrogen evolution). However, the release of hydrogen is typically being restrained ("held-back") to some extent by the kinetics (e.g., temperature, composition, etc.). Many metastable hydrogen carriers are characterized by low desorption enthalpies and very high equilibrium pressures (e.g., greater than 100 kPa).

Metastable hydrides may include metal hydrides, destabilized multiple-phase hydride systems, saturated hydrocarbons, kinetically limited equilibrium hydrides, etc. Metastable hydride materials require less heat to release the hydrogen at practical pressures (e.g., ambient pressure) and often exhibit rapid H$_2$ evolution rates (rate of hydrogen release) at low temperatures (e.g., about 80° C. to about 100° C.), due to the large driving force for decomposition (i.e., to release hydrogen). Metastable hydrides may also include additives such as catalysts that modify (improve) the kinetics while still retaining kinetic barriers that characterize the metastable behavior.

Examples of metastable metal hydrides include aluminum hydride (AlH$_3$), lithium aluminum hydride (LiAlH$_4$ and Li$_3$AlH$_6$), magnesium aluminum hydride (Mg(AlH$_4$)$_2$), calcium aluminum hydride (Ca(AlH$_4$)$_2$), and hydrides of Ti—Al alloys. Examples of destabilized (or reactive composite) multiple-phase hydride systems include LiBH$_4$/MgH$_2$, MgH$_2$/Si, LiBH$_4$/Al, LiBH$_4$/MgF$_2$, LiBH$_4$/Mg$_2$FeH$_6$, LiBH$_4$/Mg$_2$NiH$_4$ and LiH/LiOH (which releases hydrogen exothermically). In the multiple-phase hydride systems, the multiple phases that characterize these systems can impose significant kinetic barriers that lead to temperatures for practical rates of hydrogen release that are greater than the equilibrium temperatures for a chosen release pressure. For example, the LiBH$_4$/MgH$_2$ system includes the hydrogenated phases LiBH$_4$ and MgH$_2$, and the dehydrogenated phases MgB$_2$ and LiH. The hydrogenated phases LiBH$_4$ and MgH$_2$ must interact with each other and be consumed for the release of hydrogen. The dehydrogenated phases MgB$_2$ and LiH must nucleate and grow during hydrogen release. Examples of metastable saturated hydrocarbons include C$_{10}$H$_{22}$ (decane) and C$_{20}$H$_{42}$ (icosane).

Metastable kinetically limited equilibrium hydrides are those hydrides that ideally or in some circumstances would be reversible hydrides (which are able to be rehydrogenated under moderate temperature and pressure conditions), yet the kinetic limitations make it behave as a metastable hydride. Reversible hydrides release hydrogen through a thermolysis reaction (temperature stimulated hydrogen release) when the temperature of the hydrogen carrier is raised above the equilibrium temperature for a given hydrogen partial pressure. Conversely, hydrogen uptake occurs when the temperature is lowered below the equilibrium temperature. In this scenario the rate of hydrogen release is naturally controlled by a material maintained at a constant temperature. Examples of metastable kinetically limited equilibrium hydrides include $NaAlH_4$ and $Mg(BH_4)_2$. For example, $NaAlH_4$ hydride has been extensively studied and developed as an equilibrium hydride. However, hydrogen release from $NaAlH_4$ is kinetically limited, and near equilibrium behavior can be achieved only with the addition of catalytic additives and/or nano-scaling. For such a system, the extent to which the kinetic limitations are reduced can be tailored and therefore enabling $NaAlH_4$ to be utilized as a metastable hydride. Similarly, hydrogen release from $Mg(BH_4)_2$ is kinetically limited even with the addition of catalysts or formation of alloys such as $Mg_{0.5}Mn_{0.5}(BH_4)_2$, and may be utilized as a metastable hydride with tailored kinetic limitations.

Table 1 is a comparison of the specific energy (in MJ/Kg) and energy density (in MJ/L) among hydrogen tanks, conventional batteries, and a fuel cell system utilizing $AlH_3$ ($AlH_3$/fuel cell) as the fuel. In the $AlH_3$/fuel cell case, a 50 kW fuel cell operating at 50% conversion efficiency was assumed, with an additional 50% penalty for weight and volume of the tank, fuel cell, and additional hardware, which results in a system with 25% of the material energy density. Even so, as shown in Table 1, a hydrogen fuel cell utilizing a metal hydride (e.g., $AlH_3$) as a $H_2$ source yields gravimetric and volumetric energy densities of about four times that of the best performing lithium batteries.

TABLE 1

| Energy Source | Specific Energy (MJ/kg) | Energy Density (MJ/L) |
| --- | --- | --- |
| 700 bar hydrogen tank | 3.1 | 1.6 |
| 350 bar hydrogen tank | 3.3 | 1.1 |
| $AlH_3$/fuel cell | 3.1 | 4.3 |
| Li polymer | 0.72 | 1.1 |
| Ni-Metal hydride | 0.29 | 0.36 |
| Ni-Cd | 0.18 | 0.36 |
| Pb-acid | 0.11 | 0.14 |

Because the energy density of a power source made of a metal hydride and a fuel cell (such as a PEM fuel cell) is substantially larger than even the lithium batteries currently available, the metastable hydrides such as those listed above may be ideally suited for portable power systems where weight and volume are critical.

However, a particular challenge with these materials is controlling the release of hydrogen, for example, the rate of hydrogen release. A kinetic barrier is often utilized to limit the decomposition, which, due to its temperature dependence (e.g., Arrhenius behavior), allows the hydrogen release to be controlled thermally.

The Arrhenius behavior associated with the kinetic barrier suggests that thermal control over the hydrogen release is possible, but the rates are a function of both temperature and composition. As such, a constant temperature will not simply give a constant rate of hydrogen release, unlike the reversible (or equilibrium) hydrides. Therefore, controlling the rate of hydrogen release from a metastable hydrogen carrier is more challenging.

FIG. 1 is a flow chart illustrating a method of controlling a rate of hydrogen release (hereinafter, interchangeably used as "the rate") from a decomposition reaction of a hydrogen carrier according to an embodiment of the present disclosure. Referring to FIG. 1, a method of controlling a rate of hydrogen release from a decomposition reaction of a metastable hydrogen carrier includes: relating the rate of hydrogen release to a temperature and a composition of the metastable hydrogen carrier; determining the composition of the metastable hydrogen carrier; and adjusting the temperature according to the relating of the rate and the determining of the composition. The decomposition reaction may be a thermally neutral reaction, an endothermic reaction or an exothermic reaction. The rate of hydrogen release may be a constant rate.

The metastable hydrogen carrier may be in the solid state or liquid state and may be far from reaching the equilibrium state (i.e., the equilibrium hydrogen pressure is much greater than a desired, required, safe and/or reasonable pressure). The rate of hydrogen release of the metastable hydrogen carrier may be described as a function of temperature and composition and kinetically controlled by adjusting the temperature of the metastable hydrogen carrier. The relating of the rate of hydrogen release to the temperature and the composition of the metastable hydrogen carrier may result in a relationship in the form of a rate equation or a look-up table. In the rate equation, the rate of hydrogen release may be expressed as a function of temperature and composition, or the temperature may be expressed as a function of the rate and composition. In the look-up table, the rate of hydrogen release at various temperatures and compositions are listed in a plurality of rows (or columns) and each row (or column) includes one rate of hydrogen release and the corresponding temperature and composition.

The determining of the composition of the metastable hydrogen carrier provides the value of the composition of the metastable hydrogen carrier utilized in the relationship among the rate of hydrogen release, the temperature and the composition, and may be utilized to determine the target temperature for a desired rate of hydrogen release at that composition.

Here, the composition refers to the percent of hydrogen released from the metastable hydrogen carrier based on the total amount of hydrogen in the pure (pristine) hydrogen carrier prior to any decomposition reaction.

For example, hydrogen is 10 weight percent (wt %) in pure $AlH_3$ (pristine $AlH_3$) based on the total weight of $AlH_3$. For a pure $AlH_3$, the composition, representing the percent of hydrogen released, is 0%. When a given amount of hydrogen is released, pure $AlH_3$ turns to be a mixture of Al, $H_2$ and $AlH_3$ with Al and $AlH_3$ remaining in the solid phase and $H_2$ in a separate gas phase. For example, when 1 wt % hydrogen has been released (i.e., 9 wt % hydrogen remains) in a mixture of Al—$AlH_3$, the composition of this metal hydride is calculated by the amount of hydrogen released divided by the total amount of hydrogen in the pure metal hydride. Accordingly, the composition of the $AlH_3$ with 1 wt % (out of 10 wt % total) hydrogen released is determined to be 10%. Similarly, when the hydrogen has been completely decomposed, the solid phase includes only Al, and the composition at this stage is determined to be 100%.

Here, the term "composition" as defined above may also represent the weight of Al metal (not bound to hydrogen) over the total weight of all of the Al in the solid phase. That is, prior to any decomposition (i.e., when no hydrogen has been released from the pure $AlH_3$, also referred to as the pristine $AlH_3$), the composition is 0% (i.e., no free Al that is not bound to hydrogen exists in the system). When hydrogen has been completely released and all Al in the system are in the form of free Al, the composition is 100%.

When controlling the rate of hydrogen release, at an initial time $t_0$, the composition of the metastable hydrogen carrier may be $x_0$, and a target rate of hydrogen release may be $r_0$. The required temperature for a rate of $r_0$ when the composition is $x_0$ is then determined according to the rate equation. As the composition of the metastable hydrogen carrier changes as a function of the rate and time, the composition $x_i$ at a time $t_i$ is tracked, and utilized in the rate equation for the calculation of the required temperature corresponding to the rate $r_i$ at time $t_i$.

As hydrogen is being released from the metastable hydrogen carrier, the composition of the metastable hydrogen carrier changes with time. The determining of the composition (e.g., the current composition) of the metastable hydrogen carrier (at the current time in order to determine the target temperature for the current time) may include measuring the composition (e.g., the current composition) of the metastable hydrogen carrier directly. In another embodiment, determining of the composition (e.g., the current composition) of the metastable hydrogen carrier may include tracking the composition of the metastable hydrogen carrier over time. For example, the determining of the composition may include: measuring a hydrogen flow rate (or the hydrogen release rate); integrating the hydrogen flow rate (over time) to determine a cumulative amount of evolved hydrogen; and dividing the cumulative amount of evolved hydrogen by a total amount of stored hydrogen in the metastable hydrogen carrier to determine the composition.

The rate equation may be a function with one or more constants that are independent of temperature and one or more parameters that are dependent on temperature. The parameters that are dependent on temperature may be dependent on temperature in an Arrhenius form, or any other suitable forms.

Figure 2:
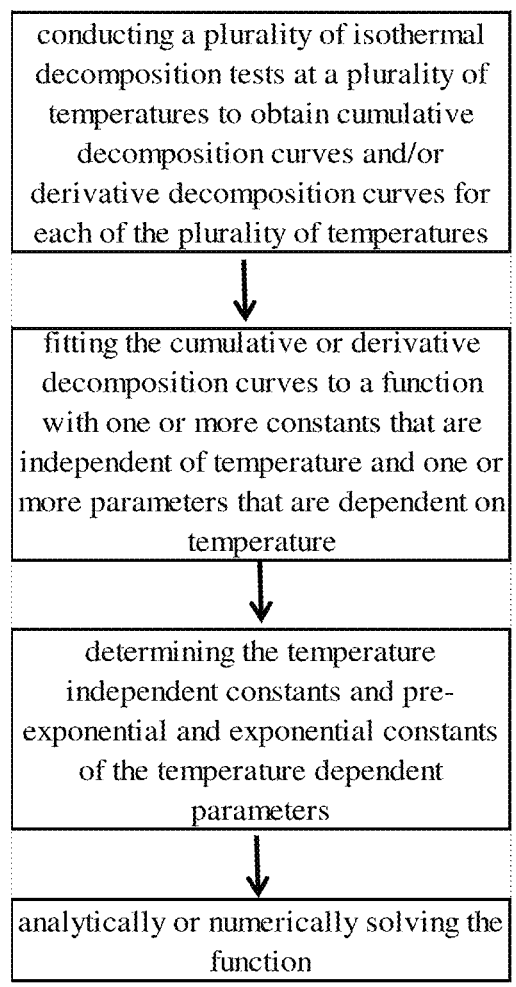
FIG. 2 is a flow chart illustrating a method of determining a rate equation according to an embodiment of the present disclosure.

FIG. 2 is a flow chart illustrating a method of determining a rate equation according to an embodiment of the present disclosure. Referring to FIG. 2, a method for determining a rate equation representing the rate of hydrogen release includes: conducting a plurality of isothermal decomposition reactions at a plurality of temperatures to obtain cumulative decomposition curves and/or derivative decomposition curves for each of the plurality of temperatures; fitting the cumulative or derivative decomposition curves to the function with one or more constants that are independent of temperature and one or more parameters that are dependent on temperature in a suitable form (with pre-exponential and exponential constants); determining the temperature independent constants and pre-exponential and exponential constants of the temperature dependent parameters; and analytically or numerically solving the function. The temperature dependent parameters may be dependent on temperature in an Arrhenius form, or any other suitable forms, which may be explicitly included for the temperature, given a specified composition and decomposition rate. The cumulative decomposition curves plot composition as a function of time and the derivative decomposition curves plot the rate of change in composition as a function of time.

The Arrhenius form may be represented by Equation 3:

$$k(T) = A\exp\left(\frac{-E_a}{RT}\right) \qquad \text{Equation 3}$$

In Equation 3, k represents a parameter that is dependent on temperature, $E_a$ is the activation energy, R is the gas constant, T represents temperature, and A is a constant.

The rate equation may be in the form of Equation 4 where the decomposition rate is expressed as a function of temperature and composition, or in the form of Equation 2, where temperature is expressed as a function of the decomposition rate and composition.

$$r = r_0 + \frac{A}{(x-x_0)^2 + B} \qquad \text{Equation 4}$$

$$T = \left[-\frac{R}{E_a}\ln\left(\frac{r}{r_{00} + \frac{A_0}{(x-x_0)^2 + B}}\right)\right]^{-1} \qquad \text{Equation 2}$$

In Equations 4 and 2, r represents the decomposition rate, T represents temperature, x represents the composition, R is the gas constant, $E_a$ is the activation energy, $r_{00}$, $A_0$, B, and $x_0$ are constants, and $r_0$ and A are temperature dependent parameters that satisfies the following Equations 5 and 6:

$$A(T) = A_0\exp\left(\frac{-E_a}{RT}\right) \qquad \text{Equation 5}$$

$$A(T) = A_0\exp\left(\frac{-E_a}{RT}\right) \qquad \text{Equation 6}$$

By fitting the cumulative or derivative decomposition curves to the form of Equation 4 or Equation 2, the temperature independent constants (e.g., B, $x_0$) and pre-exponential constants (e.g. $A_0$, $r_{00}$) and exponential constants (e.g., $E_a$) of the temperature dependent parameters (e.g., $r_0$ and A) are determined. Equation 4 and/or Equation 2 is thereby solved and may be utilized for the prediction or control of the decomposition reaction. By determining the composition of the metastable hydrogen carrier, any rate of hydrogen release may be achieved at any point during decomposition with the application of the rate equation.

In one embodiment, hydrogen is released by heating the metastable hydrogen carrier to a target temperature, without the inclusion of (absent of) other chemical reagents to react with the metastable hydrogen carrier in order to release hydrogen from the metastable hydrogen carrier.

Figure 3:
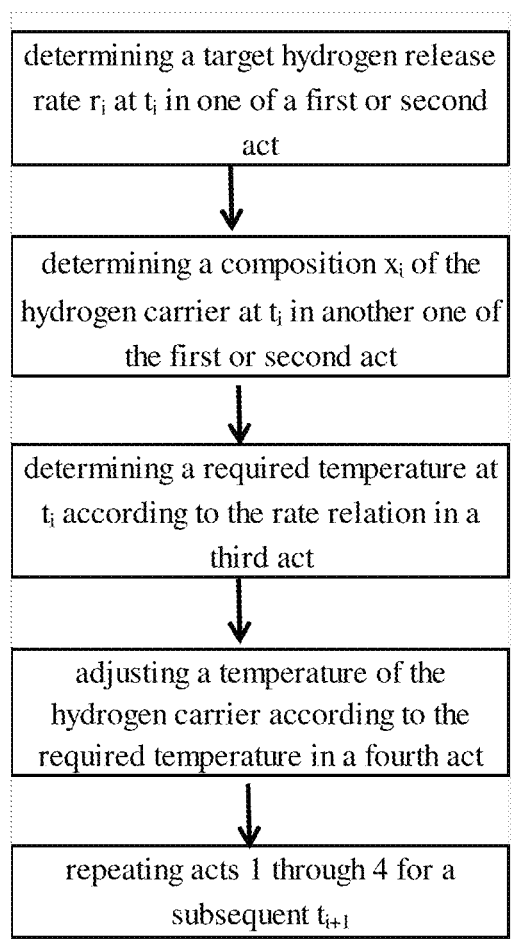
FIG. 3 is a flow chart illustrating a method of controlling a rate of hydrogen release from a decomposition reaction of a hydrogen carrier according to an embodiment of the present disclosure.

FIG. 3 is a flow chart illustrating a method of controlling a rate of hydrogen release from a decomposition reaction of a metastable hydrogen carrier according to an embodiment of the present disclosure. Referring to FIG. 3, a method for thermally controlling the rate of hydrogen release from a metastable hydrogen carrier according to a rate relation includes: determining a target rate of hydrogen release $r_i$ at $t_i$ in one of a first or second act, t representing time and i being an integer; determining a composition $x_i$ of the metastable hydrogen carrier at $t_i$ in another one of the first or second act; determining a required temperature at $t_i$ according to the rate relation in a third act; adjusting a temperature of the metastable hydrogen carrier according to the required temperature in a fourth act; and repeating acts 1 through 4 for a subsequent $t_{i+1}$. The rate relation determines the required temperature according to the target rate of hydrogen release and the composition of the metastable hydrogen carrier. Here, the difference between $t_i$ and $t_{i+1}$ may be a constant value, for example, 0.1 seconds, 1 second, 1 minute, etc., or may be infinitesimal, i.e., the composition of the metastable hydrogen carrier is continuously determined (calculated and/or measured) and the rate of hydrogen release may be continuously adjusted to provide the profile of the target rate of hydrogen release.

The profile of the target rate of hydrogen release may be a constant rate over time, or may be a variable of time. The determining of the target rate of hydrogen release may include determining a desired load of a power system, where the power system utilizes the hydrogen from the metastable hydrogen carrier as a fuel. For example, the determining of the desired load of the power system may include measuring the current draw of a fuel cell.

In repeating acts 1 through 4 for a subsequent $t_{i+1}$, the target rate of hydrogen release $r_{i+1}$ at $t_{i+1}$ is determined; the composition $x_{i+1}$ of the metastable hydrogen carrier at $t_{i+1}$ is also determined. Then, the required temperature at $t_{i+1}$ according to the rate relation is determined followed by the adjustment of the temperature of the metastable hydrogen carrier. Here, the determining of the composition $x_{i+1}$ of the metastable hydrogen carrier at $t_{i+1}$ may include: calculating a product of the hydrogen flow rate $r_i$ and $(t_{i+1}-t_i)$; and adding the product and $x_i$ to obtain $x_{i+1}$. However, embodiments of the present disclosure are not limited thereto and the composition of the metastable hydrogen carrier may be obtained through any suitable methods.

The rate relation may be expressed in the form of a rate equation (rate-temperature-composition equation), such as Equation 2 or 4 disclosed above, or a look-up table.

Figure 4:
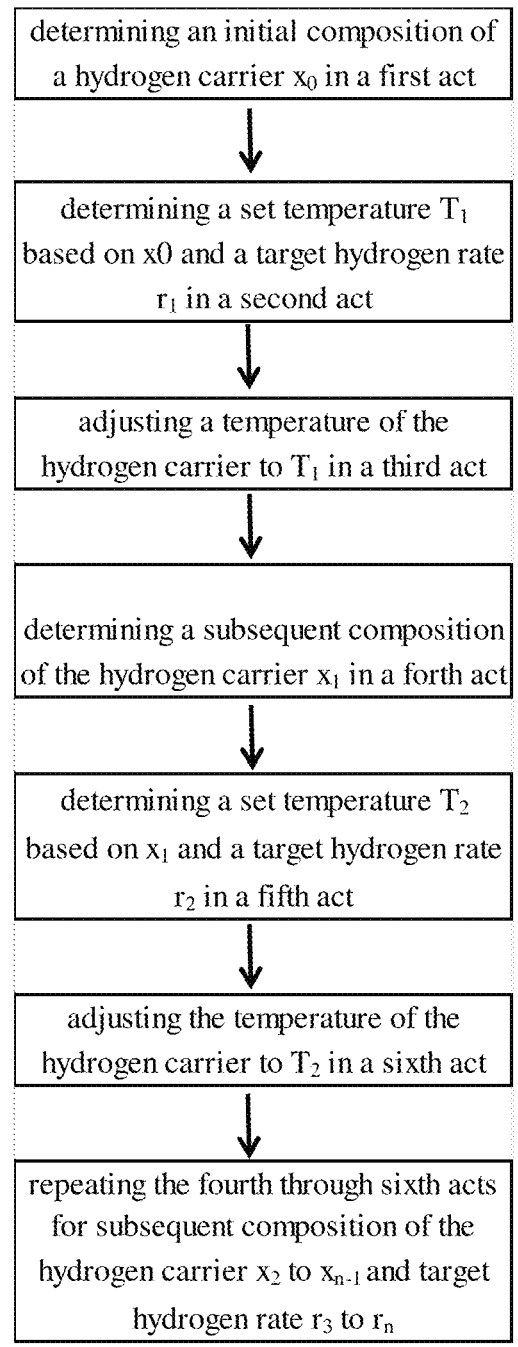
FIG. 4 is a flow chart illustrating a method of controlling a rate of hydrogen release from a decomposition reaction of a hydrogen carrier according to an embodiment of the present disclosure.

Sometimes, the initial composition of the metastable hydrogen carrier may not be zero. That is, the metastable hydrogen carrier may have gone through partial decomposition before the beginning of the rate control. FIG. 4 is a flow chart illustrating a method of controlling a rate of hydrogen release from a decomposition reaction of a metastable hydrogen carrier whose initial composition is not 0% according to an embodiment of the present disclosure. Referring to FIG. 4, a method for thermally controlling the rate of hydrogen release from a metastable hydrogen carrier according to a rate equation includes: determining an initial composition $x_0$ of a hydrogen carrier in a first act; determining a set temperature $T_1$ based on $x_0$ and a target hydrogen rate $r_1$ in a second act; adjusting a temperature of the metastable hydrogen carrier to $T_1$ in a third act; determining a subsequent composition of the metastable hydrogen carrier $x_1$ in a forth act; determining a set temperature $T_2$ based on $x_1$ and a target hydrogen rate $r_2$ in a fifth act; adjusting the temperature of the metastable hydrogen carrier to $T_2$ in a sixth act; and repeating the fourth through sixth acts for subsequent composition of the metastable hydrogen carrier $x_2$ to $x_{n-1}$ and target hydrogen rate $r_3$ to $r_n$. Here, n represents an integer.

The initial composition of the metastable hydrogen carrier may be determined utilizing any suitable method. For example, one method may include applying a temperature profile (ramp or constant) to the metastable hydrogen carrier (e.g., a hydride bed), measuring the rate of hydrogen release, and determining the composition from the rate-temperature-composition equation or a look-up table. This process could occur during the metastable hydrogen carrier (e.g., hydride bed) warm up period. Given the limited supply of hydrogen, it is desirable that the initial composition measurement consumes as little hydrogen as possible.

Figure 5:
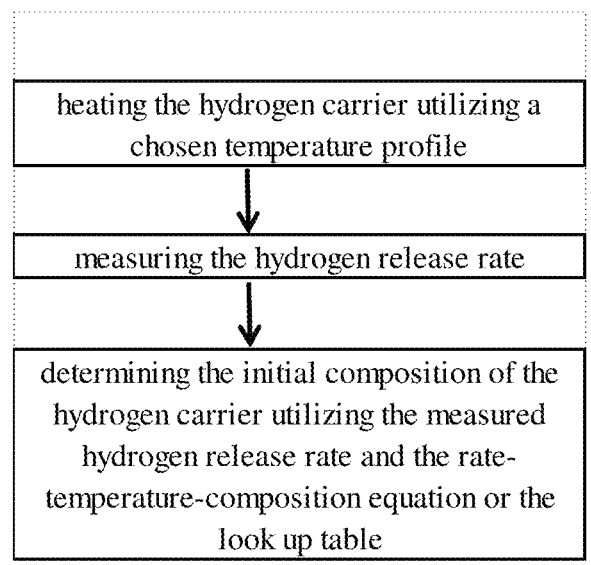
FIG. 5 is a flow chart illustrating a method of determining the initial composition of a hydrogen carrier according to an embodiment of the present disclosure.

FIG. 5 is a flow chart illustrating a method of determining the initial composition of a metastable hydrogen carrier according to an embodiment of the present disclosure. Referring to FIG. 5, the method includes: heating the metastable hydrogen carrier utilizing a chosen temperature profile; measuring the rate of hydrogen release; determining the initial composition of the metastable hydrogen carrier utilizing the measured rate of hydrogen release and the rate-temperature-composition equation or the look-up table.

In one embodiment, the method may further include determining the rate relation. The determining of the rate relation may include measuring a plurality of rates of hydrogen release at a plurality of isothermal desorption temperatures; and determining the constants of Equation 2 or building a look-up table according to the plurality of rates of hydrogen release and the plurality of isothermal desorption temperatures. The isothermal desorption measurements for establishing the rate-temperature-composition equation may be conducted once for a batch of materials, rather than conducted for each device that utilizes fuels from the same batch of materials.

The chosen temperature profile may be any suitable temperature profile, such as a constant temperature step or steps, a linear ramp, a sine wave, or a combination thereof. In one embodiment, two or more of the above described temperature profiles may be sequentially combined. For example, a linear ramp at a constant heating rate may be followed by a constant temperature step.

The measuring of the rate of hydrogen release is conducted during the heating of the metastable hydrogen carrier. The rate may be measured directly (e.g., through a flow meter) or indirectly (e.g., through the measurement of cumulative pressure, and then calculate the rate through differentiation of the cumulative pressure).

The rate of hydrogen release versus the composition may be a "bell-shaped" (Lorentzian) curve (see FIG. 9), where a given rate may correspond to two possible compositions (e.g., one prior to the peak position of the bell-shaped curve and another after the peak position). If prior knowledge of the state of the metastable hydrogen carrier is available (e.g., knowledge that the tank is more or less than half full, or knowledge that the composition of the metastable hydrogen carrier is greater or less than 50%), then only one temperature-rate measurement is needed to determine the composition. If no knowledge of the state of composition exits, then two rate measurements are needed to determine if the rate is increasing or decreasing, and selecting the composition on the respective side of the curve.

The composition may also be measured by a direct method.

According to an embodiment of the present disclosure, a method of determining a rate relation of hydrogen release from a metastable hydrogen carrier according to a temperature and time includes: conducting a plurality of isothermal decomposition reactions at a plurality of temperatures to obtain data on composition as a function of time for each of the plurality of temperatures; determining respective values for n, k and $t_0$ in Equation 7 according to the data for each of the plurality of temperatures;

$$\alpha(t)=1-\exp(-k^n(t+t_0)^n) \qquad \text{Equation 7}$$

wherein in Equation 7, t represents time, x(t) represents the composition as a function of t (time), n is a constant, k is a rate constant determined by Equation 8, $t_0$ is a function of an initial composition of the metastable hydrogen carrier and determined by Equation 9, $$k(T) = k_0 \exp\left(\frac{-E_a}{RT}\right) \quad \text{Equation 8}$$

$$t_0(T) = t_{00} \exp\left(\frac{-E_a}{RT}\right) \quad \text{Equation 9}$$

wherein in Equations 8 and 9, R is the gas constant, $E_a$, $k_0$ and $t_{00}$ are constants;

determining values for $E_a$, $k_0$ and $t_{00}$ from the values for n, k and $t_0$ for the plurality of temperatures; and determining the rate of hydrogen release at a given temperature and time according to Equation 10

$$r = nk_0^n \exp\left(\frac{-nE_a}{RT}\right)\left(t + t_{00}\exp\left(\frac{-E_a}{RT}\right)\right)^{n-1}$$
$$\exp\left[-k_0^n \exp\left(\frac{-nE_a}{RT}\right)\left(t + t_{00}\exp\left(\frac{-E_a}{RT}\right)\right)^n\right]. \quad \text{Equation 10}$$

Hereinafter, embodiments of the present disclosure will be illustrated in more detail utilizing $\alpha$-AlH$_3$ as an example hydrogen carrier. While $\alpha$-AlH$_3$ is utilized as an example in the methods of determining the rate equation and demonstrating the thermal control of the rate of hydrogen release, embodiments of the present disclosure are not limited thereto. The method may be applied to control the hydrogen release of any suitable hydrogen carrier (e.g., any suitable hydride) where heat input is required to remove hydrogen under far from equilibrium conditions.

$\alpha$-AlH$_3$ is thermodynamically unstable at room temperature and has an equilibrium pressure of around 7 kbar. Despite the large driving force for decomposition, the material is easily prepared in a kinetically stabilized state through the formation of a surface oxide/hydroxide layer. This passivation layer reduces or prevents hydrogen atoms from recombining at the surface and thereby inhibits decomposition.

The solid state decomposition of AlH$_3$ to form H$_2$ and Al is a function of various parameters (e.g., grain boundaries, defects, surface area, nucleation sites, and thermal conductivity), but generally, a single rate-limiting step can be identified that defines the reaction rate. The composition x (also referred to as the fractional decomposition throughout this disclosure) of $\alpha$-AlH$_3$ exhibits three distinct periods of desorption as shown in FIG. 6. The first region (I) is identified as a slow induction period (x<0.04 or 4%), followed by an acceleratory period (II) (0.04 or 4%<x<0.7 or 70%) in which the rate of H$_2$ desorption increases rapidly, and, finally, a decay period (III) (0.7 or 70%<x). For isothermal solid-state reactions, the fractional decomposition can be expressed by the following time-dependent (t) kinetic Equation 11 developed by Avrami and Erofeyev:

$$x(t) = 1 - \exp(-k^n t^n) \quad \text{Equation 11}$$

In Equation 11, x(t) is the composition at time t, n is a constant number ($1 \leq n \leq 3$) determined by the nucleation and growth geometry; and the rate constant, k, is typically a function of the nucleation frequency and growth rate and can be expressed as an Arrhenius equation, as shown in Equation 3 below:

$$k(T) = A \exp\left(\frac{-E_a}{RT}\right) \quad \text{Equation 3}$$

In Equation 3, $E_a$ is the activation energy and A is a constant.

$\alpha$-AlH$_3$ was prepared by ATK-Thiolol (now Orbital ATK) and obtained from Savannah River National Laboratory. Preliminary H$_2$ desorption measurements revealed that the material was composed of about 8 wt % hydrogen, suggesting a purity of about 80% AlH$_3$ with Al as the most likely impurity (about 20%). That is, about 20% of the hydrogen based on the total amount of hydrogen carried by the pristine $\alpha$-AlH$_3$ has been released upon arrival and the $\alpha$-AlH$_3$ is actually a mixture of 20% Al-80% AlH$_3$. The material was stored in an inert Ar glove box prior to the experimentation, but still exhibited slow continuous desorption even at room temperature.

Measurements on a series of isothermal decomposition reactions of $\alpha$-AlH$_3$ were performed and a plot of the fractional decomposition is shown in FIG. 7 (a). In these experiments, approximately 300 mg of $\alpha$-AlH$_3$ was sealed in a small reactor and connected to a Sievert's system with a calibrated gas reservoir for isothermal desorption (i.e., AlH$_3 \rightarrow$ Al+3/2H$_2$). The reactor was heated to various temperatures (103° C. to 140° C.) utilizing a resistive heating tape and the temperature was monitored with an internal thermal couple. Approximately 7.8 wt % hydrogen was desorbed from these samples with insignificant (e.g., minimal) variation from sample-to-sample. Because this material was in a state of partial decomposition (pure AlH$_3$ has 10 wt % hydrogen), the maximum evolved hydrogen was set to 10% (to account for the released hydrogen prior to the experiments), which allows for the characterization of the complete desorption profile for a pure material (i.e., extrapolate back to 0 wt %). For the kinetic analysis, the fractional decomposition was utilized (FIG. 7 (a)), which is simply the amount of evolved hydrogen normalized to 1 (all values divided by 10). The rate of hydrogen release was determined from the derivative of the fractional decomposition curve and is shown in FIG. 7 (b).

The isothermal fractional decomposition curves in FIG. 7 (a) were fit to a modified Avrami-Erofeev equation-Equation 7:

$$x(t) = 1 - \exp(-k^n(t+t_0)^n) \quad \text{Equation 7}$$

In Equation 7, t is time, k is the rate constant (function of temperature), n is an exponent determined through the fit and typically between 1 and 3, and $t_0$ represents the additional time that would be required to decompose the pure hydride from x=0 to x=0.215 (i.e., extrapolate the decomposition curve down to x=0). The best fits were obtained with an exponent of n=3. The solid lines in FIG. 7 (a) are the calculated fractional decomposition values based on Equation 7 utilizing the chosen values of t, k and n. The solid lines in FIG. 7 (b) represent the rate of hydrogen release, which was obtained as the derivative of the fractional decomposition fit of Equation 7, as shown below in Equation 12:

$$r = \frac{dx}{dt} = nk^n(t+t_0)^{n-1} \exp(-k^n(t+t_0)^n) \quad \text{Equation 12}$$

Figure 8:
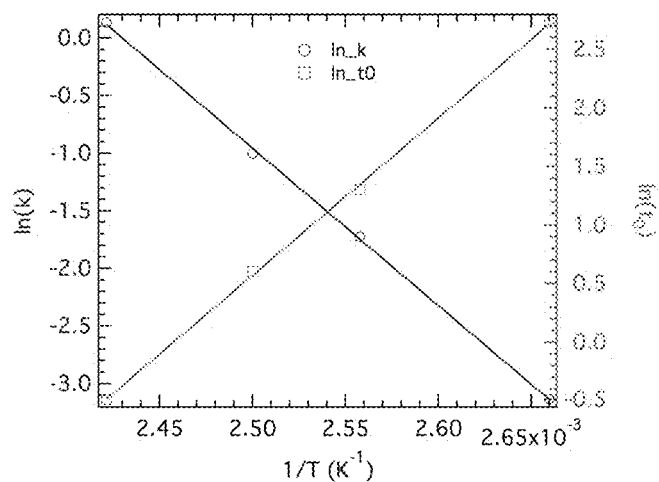
FIG. 8 is an Arrhenius plot showing ln(k) and ln(t$_0$) plotted versus inverse temperature.

The rate constants and $t_0$ values determined from the fits in FIG. 7 (a) exhibit an Arrhenius behavior with temperature, as shown in FIG. 8. The linear fits to the data plotted in this figure are utilized in the following Equations 8 and 9 for k and $t_0$:

$$k(T) = k_0 \exp\left(\frac{-E_a}{RT}\right) \qquad \text{Equation 8}$$

$$t_0(T) = t_{00} \exp\left(\frac{-E_a}{RT}\right) \qquad \text{Equation 9}$$

In Equations 8 and 9, T is the absolute temperature, R is the gas constant, $k_0 = 2.53 \times 10^{14}$ and $E_a = 112.6 \pm 2$ kJ/mol $H_2$ and $t_{00} = 4.6 \times 10^{-15}$. Combining Equations 12, 8 and 9 leads to the following Equation 10 for the rate of hydrogen release:

$$r = nk_0^n \exp\left(\frac{-nE_a}{RT}\right)\left(t + t_{00}\exp\left(\frac{-E_a}{RT}\right)\right)^{n-1}$$
$$\exp\left[-k_0^n \exp\left(\frac{-nE_a}{RT}\right)\left(t + t_{00}\exp\left(\frac{-E_a}{RT}\right)\right)^n\right] \qquad \text{Equation 10}$$

Equation 10 describes the relationship between the rate of hydrogen release and time for a given temperature. In an actual system, the temperature of the metal hydride bed may vary in response to the demand from the fuel cell. In this case, it is more useful to describe the rate of hydrogen release as a function of temperature and composition, rather than time. The rate of the factional decomposition was plotted as a function of composition (shown in FIG. 9) to better reveal the relationship between rate of hydrogen release versus temperature and composition.

Figure 9:
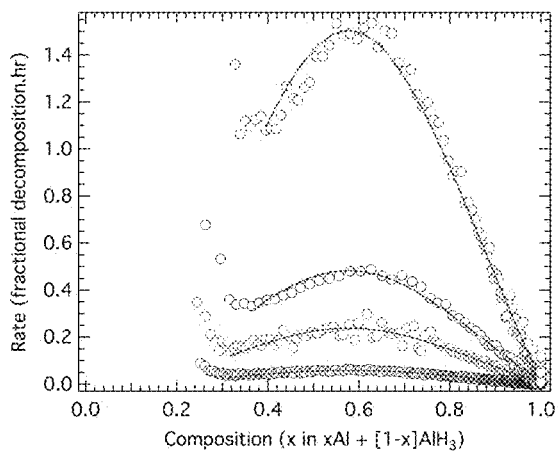
FIG. 9 is a plot showing fractional decomposition of $\alpha$-AlH$_3$ versus composition. The solid line represents a fit utilizing a Lorentzian function.

Various fits were applied to the curves in FIG. 9. When the derivative of the Avrami-Erofeev equation (Equation 7) was utilized, it resulted in a relatively poor fit over the temperature range studied. A much better fit was obtained with a standard Lorentzian function shown in Equation 4:

$$r = r_0 + \frac{A}{(x-x_0)^2 + B} \qquad \text{Equation 4}$$

In Equation 4, x is the composition (e.g., the current composition) and $r_0$, $x_0$, A and B are fit parameters. The curve fits exhibited nearly constant values of $x_0$ and B (average values were $x_0 = 0.577$ and $B = 0.267$), while $r_0$ and A exhibited an Arrhenius behavior with temperature as shown in Equations 5 and 6:

$$A(T) = A_0 \exp\left(\frac{-E_a}{RT}\right) \qquad \text{Equation 5}$$

$$r_0(T) = r_{00} \exp\left(\frac{-E_a}{RT}\right) \qquad \text{Equation 6}$$

A plot of A(T) and $r_0(T)$ as a function of temperature are shown in FIG. 10. The curve fits (utilizing Equations 5 and 6), also shown in FIG. 10, gave the following fit parameters: $A_0 = 1.1 \times 10^{14}$, $r_{00} = -1.9 \times 10^{14}$ and $E_a = 111.2$ kJ/mol $H_2$. Combining Equations 4-6 gives the following Equation 1:

$$r = \exp\left(\frac{-E_a}{RT}\right)\left(r_{00} + \frac{A_0}{(x-x_0)^2 + B}\right) \qquad \text{Equation 1}$$

Rearranging Equation 1 yields Equation 2—an expression for temperature as a function of rate and composition:

$$T = \left[-\frac{R}{E_a} \ln\left(\frac{r}{r_{00} + \frac{A_0}{(x-x_0)^2 + B}}\right)\right]^{-1} \qquad \text{Equation 2}$$

Utilizing Equation 2, a set of constant rate curves (at a rate of 0.5 wt %/hr, 1 wt %/hr and 2 wt %/hr respectively) as a function of composition were generated and shown in FIG. 11 (a). Given the rates are constant in these plots, the composition is converted into time (e.g., by dividing the composition with the rate) to get a plot of temperature versus time (FIG. 11 (b)). While the Avrami-Erofeev function and the standard Lorentzian function have been described in fitting the isothermal derivative decomposition curves, embodiments of the present disclosure are not limited thereto. Any suitable functions may be utilized, such as the Gaussian function, the Voigt function, etc.

The rate equations listed above (Equations 1, 2 and 10) can be utilized to control the rate of hydrogen release (e.g., in response to demand from a fuel cell) by controlling the temperature of the hydride. Although the curves shown in FIG. 11 correspond to constant rate scenarios, the applications of these rate equations are not limited thereto. For example, they can be utilized in applications where the rate varies with time provided the composition (x) is known throughout the decomposition. It is worth noting that the rate equations listed above (Equations 1, 2 and 10) were derived utilizing two different types of fits to the decomposition curves, but a variety of other curve fits are possible (e.g., utilizing a Gaussian function), which may yield similar results.

A 300 mg batch of $AlH_3$ was decomposed utilizing a temperature profile set for a constant rate of decomposition at 1 wt %/hr. The temperature profile was determined utilizing Equation 2 and is shown in FIG. 12 (a). The rate of hydrogen release and total amount of hydrogen evolved (released) along with the targets utilized in the rate equation are shown in FIG. 12 (b). As can be observed from FIG. 12 (b), the total evolved hydrogen increases near linearly with time at a rate of about 1 wt %/hr.

The previous example demonstrated that a constant hydrogen evolution rate could be achieved with $AlH_3$ utilizing the derived rate equation (Equation 2). In the next example, a similar temperature profile was utilized with a 5 g sample of $AlH_3$ connected to a 5-stack proton exchange membrane fuel cell. In this example, a constant load was connected to the fuel cell designed to draw a hydrogen flow rate of about 10 sscm. The hydrogen was supplied from a cartridge of $AlH_3$ equipped with an internal thermal couple and an external heater. The temperature profile was determined according to Equation 2. FIG. 13 (a) shows the pressure and hydrogen flow rate versus time and FIG. 13 (b) shows the current, voltage and power output from the fuel cell. As shown in FIG. 13 (a), the $AlH_3$ cartridge supplied a consistent hydrogen flow and nearly constant pressure for about 7 hrs. FIG. 13 (b) shows that the electrical properties were also reasonably constant over the course of the experiment with the voltage at about 3.2 V, the current at about 200 mA and a power of about 0.8 W.

In view of the foregoing, one or more embodiments of the present invention provide a method of determining the rate of hydrogen release from a metastable hydrogen carrier. The method of determining the rate of hydrogen release relates the rate of hydrogen release with the temperature and composition of the metastable hydrogen carrier.

Further, one or more embodiments of the present invention provide a method of controlling the rate of hydrogen release according to the temperature and composition of a metastable hydrogen carrier.

While one or more embodiments of the present invention have been described with reference to the figures, it will be understood by those of ordinary skill in the art that various changes in form and details may be made therein without departing from the spirit and scope of the present invention as defined by the following claims, and equivalents thereof.

What is claimed is:

1. A method for controlling a rate of hydrogen release from a metastable hydrogen carrier according to a rate relation, the method comprising:
    determining a target rate of hydrogen release $r_i$ at $t_i$ in one of a first or second act, t representing time and i being an integer;
    determining a composition $x_i$ of the metastable hydrogen carrier at $t_i$ in another one of the first or second act;
    determining a required temperature at $t_i$ according to the rate relation in a third act;
    adjusting a temperature of the metastable hydrogen carrier to the required temperature in a fourth act; and
    repeating the first through the fourth acts for a subsequent $t_{i+1}$,
    wherein the rate relation determines the required temperature according to the target rate of hydrogen release and the composition of the metastable hydrogen carrier,
    wherein the composition of the metastable hydrogen carrier is an amount of hydrogen already released by the metastable hydrogen carrier divided by a total amount of hydrogen in the metastable hydrogen carrier in a pristine condition,
    wherein the metastable hydrogen carrier comprises a metastable metal hydride comprising alpha aluminum hydride ($\alpha$-AlH$_3$) surrounded/encapsulated by a surface oxide and/or hydroxide passivation layer, and
    wherein hydrogen is released by decomposing the metastable hydrogen carrier in an endothermic or thermal neutral reaction.

2. The method of claim 1, wherein the determining the target rate of hydrogen release comprises determining a desired load of a power system, the power system utilizing the hydrogen from the metastable hydrogen carrier as a fuel.

3. The method of claim 2, wherein the determining the desired load of the power system comprises measuring a current draw of a fuel cell.

4. The method of claim 1, wherein the determining the composition of the metastable hydrogen carrier at $t_{i+1}$ in the repeating of the first through the fourth acts for the subsequent $t_{i+1}$ comprises:
    calculating a product of the rate of hydrogen release $r_i$ and $(t_{i+1}-t_i)$; and
    adding the product and $x_i$ to obtain $x_{i+1}$.

5. The method of claim 2, wherein the rate relation is determined by:

$$T = \left[-\frac{R}{E_a}\ln\left(\frac{r}{r_{00} + \frac{A_0}{(x-x_0)^2+B}}\right)\right]^{-1}, \quad \text{Equation 2}$$

wherein in Equation 2, r represents the target rate, T represents the required temperature, R is the gas constant, $E_a$ represents activation energy in unit of kJ/mol, $r_{00}$ and $A_0$ each represent a pre-exponential constant, B represents a temperature independent constant, and $x_0$ is an initial composition of the metastable hydrogen carrier, and
    wherein $E_a$, $r_{00}$, $A_0$, $x_0$ and B are determined utilizing numerical fits to isothermal cumulative or fractional decomposition curves over a range of temperatures.

6. The method of claim 5, further comprising:
    determining an initial composition of the metastable hydrogen carrier prior to the first act at $t_1$; and
    utilizing the initial composition of the metastable hydrogen carrier as the composition of the metastable hydrogen carrier at $t_1$ in the determining of the composition of the metastable hydrogen carrier in the other one of the first or second act.

7. The method of claim 6, wherein the determining of the initial composition of the metastable hydrogen carrier comprises:
    heating the metastable hydrogen carrier by applying a chosen temperature profile;
    measuring a rate of hydrogen release corresponding to the chosen temperature profile; and
    determining the initial composition of the metastable hydrogen carrier according to Equation 2.

8. The method of claim 7, wherein the chosen temperature profile is a constant temperature step, a plurality of constant temperature steps, a linear ramp, a sine wave, or a combination thereof.

9. The method of claim 2, wherein the rate relation is determined by:

$$T = \left[-\frac{R}{E_a}\ln\left(\frac{r}{r_{00} + \frac{A_0}{(x-x_0)^2+B}}\right)\right]^{-1}, \quad \text{Equation 2}$$

wherein in Equation 2, r represents the target rate, T represents the required temperature, R is the gas constant, $E_a$ represents activation energy in unit of kJ/mol, $r_{00}$ and $A_0$ each represent a pre-exponential constant, B represents a temperature independent constant, and $x_0$ is an initial composition of the metastable hydrogen carrier, and
    wherein $E_a$, $r_{00}$, $A_0$, $x_0$ and B are determined utilizing numerical fits to isothermal derivative decomposition curves with respect to composition.

10. The method of claim 9, further comprising:
    determining an initial composition of the metastable hydrogen carrier prior to the first act at $t_1$; and
    utilizing the initial composition of the metastable hydrogen carrier as the composition of the metastable hydrogen carrier at $t_1$ in the determining of the composition of the metastable hydrogen carrier in the other one of the first or second act.

11. The method of claim 10, wherein the determining of the initial composition of the metastable hydrogen carrier comprises:
    heating the metastable hydrogen carrier by applying a chosen temperature profile;
    measuring a rate of hydrogen release corresponding to the chosen temperature profile; and
    determining the initial composition of the metastable hydrogen carrier according to Equation 2.

12. The method of claim 11, wherein the chosen temperature profile is a constant temperature step, a plurality of constant temperature steps, a linear ramp, a sine wave, or a combination thereof.

13. The method of claim 1, wherein the rate relation is determined by a look-up table comprising a plurality of rows or columns of data, each row or column of data includes a rate of hydrogen release and corresponding temperature and composition of the metastable hydrogen carrier.

\* \* \* \* \*